United States Patent [19]

Fike et al.

[11] 4,116,595
[45] Sep. 26, 1978

[54] TIRE MOLD APPARATUS

[75] Inventors: Louis T. Fike, Hacienda Heights; Kenneth A. Green, Ontario, both of Calif.

[73] Assignee: Ohio Machine Company, Inc., Los Angeles, Calif.

[21] Appl. No.: 836,044

[22] Filed: Sep. 23, 1977

[51] Int. Cl.$^2$ ............................................. B29H 5/04
[52] U.S. Cl. ........................................ 425/17; 425/25; 425/40
[58] Field of Search ................. 425/17, 20, 25, 40, 425/41

[56] References Cited

U.S. PATENT DOCUMENTS

| | | | |
|---|---|---|---|
| 2,729,853 | 1/1956 | Hawkinson | 425/20 |
| 2,801,443 | 8/1957 | Duerksen | 425/41 |
| 2,932,853 | 4/1960 | Fike | 425/17 |
| 2,970,346 | 2/1961 | Fannen | 425/41 X |
| 3,154,814 | 11/1964 | Fike | 425/25 |
| 3,170,193 | 2/1965 | Fike | 425/20 |

Primary Examiner—J. Howard Flint, Jr.
Attorney, Agent, or Firm—Fulwider, Patton, Rieber, Lee & Utecht

[57] ABSTRACT

Tire mold apparatus for vulcanizing a tread onto a tire casing. The apparatus utilizes matrix segments provided with grooves that receive tubing. Steam is passed through the tubing so as to heat the matrix segments. The tubing is rigidly joined to a steam-fitting block. Fracturing of the joint between the tubing and the block due to differences in thermal expansion is avoided by slidably mounting the fitting block relative to the matrix.

3 Claims, 6 Drawing Figures

FIG. 1
FIG. 2
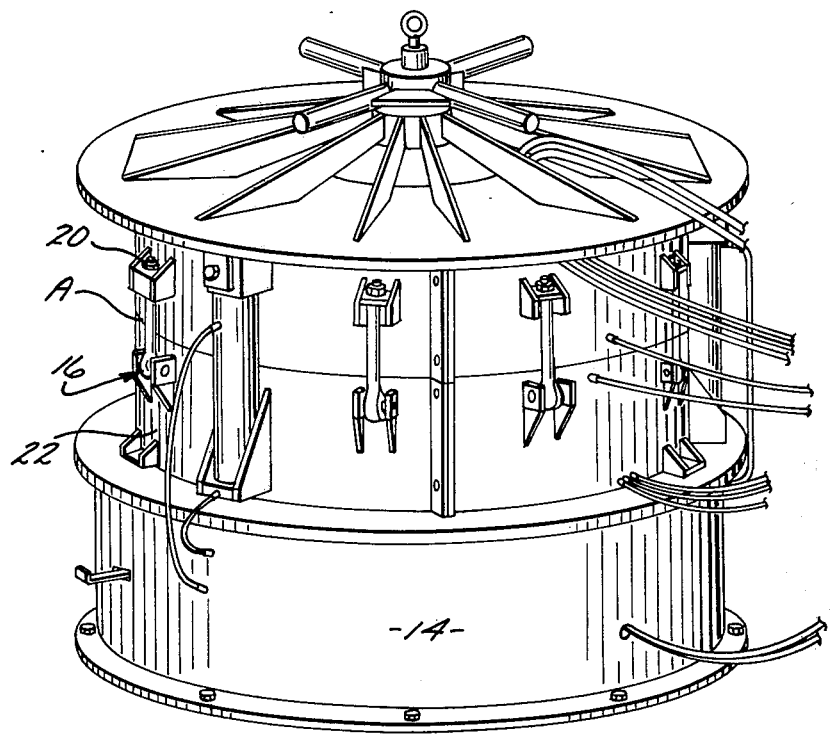
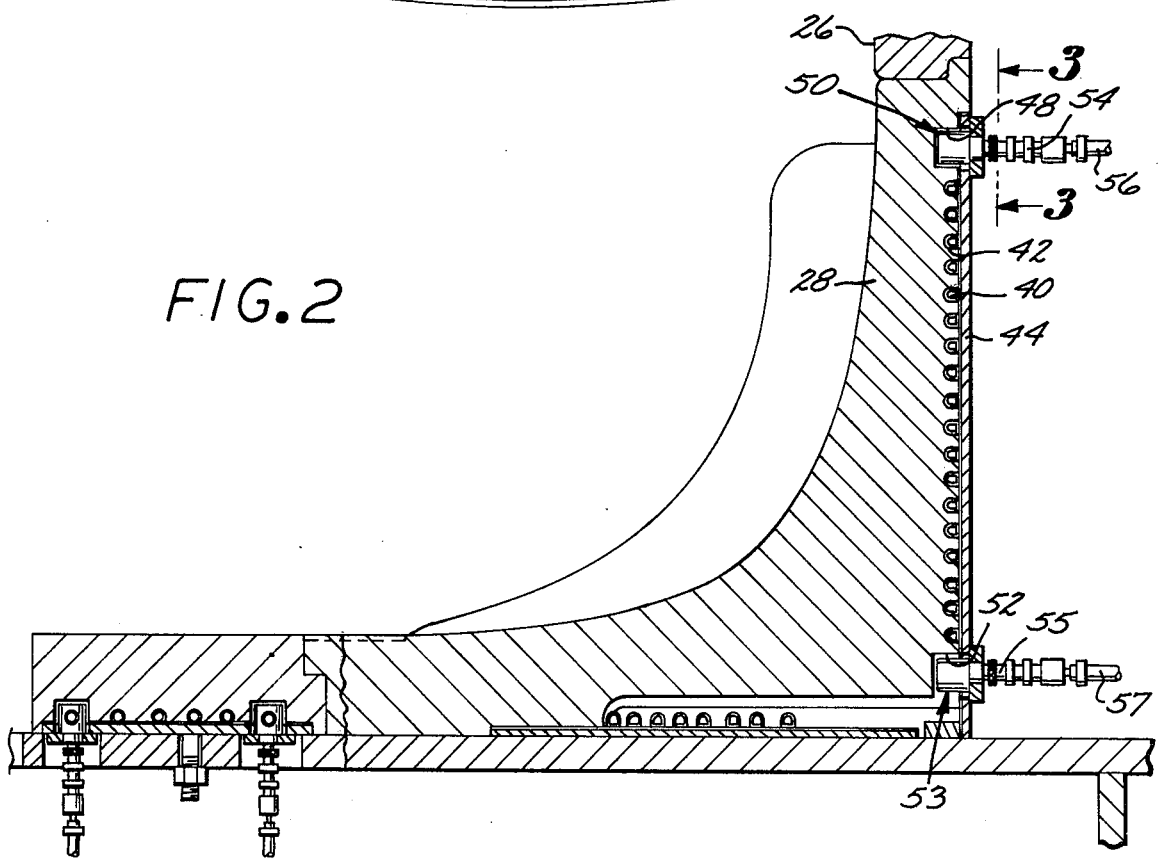

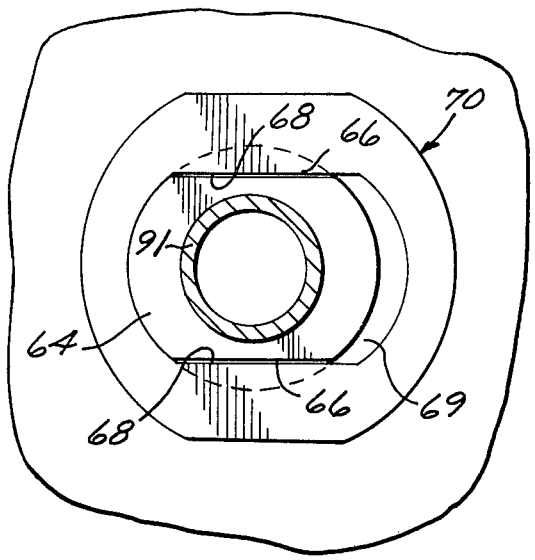
FIG.3
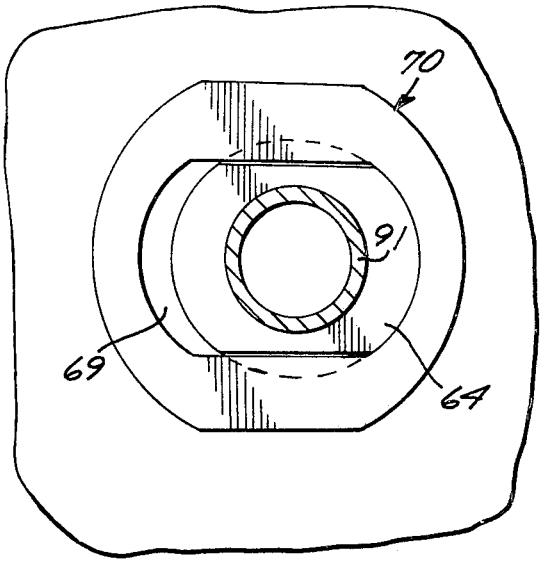
FIG.4
FIG.5
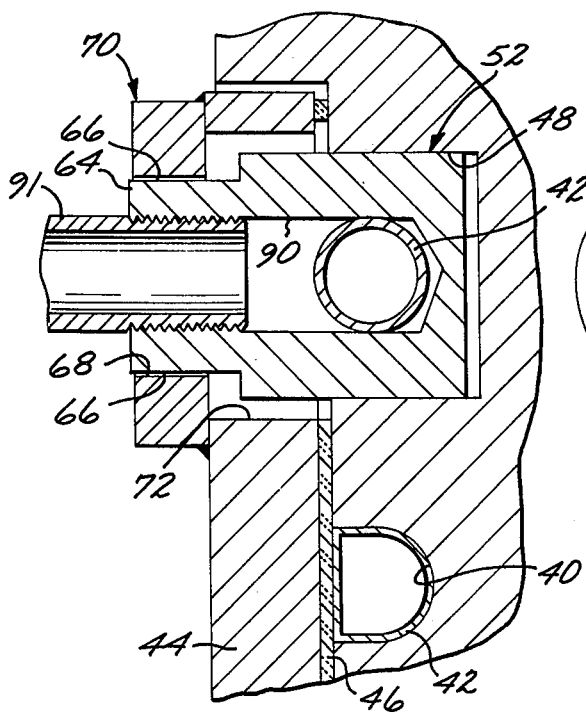
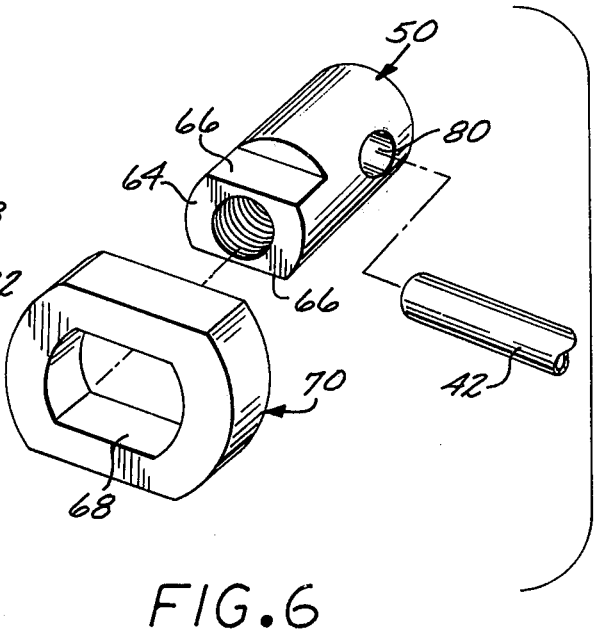
FIG.6

TIRE MOLD APPARATUS

BACKGROUND OF THE INVENTION

1. Field of the Invention

The present invention relates to the art of tire curing.

2. Description of the Prior Art

An important advance in the art of tire molding is disclosed in Louis T. Fike U.S. Pat. No. 2,932,853, issued Apr. 19, 1960. The tire capping apparatus disclosed in such patent includes an aluminum matrix having its external periphery formed with convoluted grooves. Copper tubing is disposed within such grooves and a substantially circular metal band is then tightened about the periphery of the matrix so as to distort the tubing and hold it firmly in its operative position in tight contact with the surface of the grooves. This arrangement ensures extremely good heat conductivity between the tube and the matrix. The opposite ends of the steam tube are affixed to brass steam-fitting blocks. Each block is tightly secured within a recess formed in the outer periphery of the matrix. For many years, a serious problem existed with this arrangement, namely the joint between the ends of the tubing and the steam-fitting blocks fractured after the apparatus had been in use for a period of time. Such fracturing is difficult to repair since the mold and ring must be dismantled. It is not practical to effect such repair in the field, since it is necessary to return the mold apparatus to a fully equipped shop for repair. These molds weigh up to 10,000 lbs. making them difficult and expensive to transport between the field and shop.

SUMMARY OF THE INVENTION

The tire mold apparatus of the present invention solves the problem described hereinabove by securing the ends of the steam tube to a steam-fitting block which is freely movable relative to the matrix. Accordingly, the steam-fitting block can float as the steam tubing expands and contracts relative to the matrix. With this arrangement, stresses between the tubing and the block are eliminated, with consequent reduction of the tendency of the joint material to fracture.

It is another object of the present invention to provide tire mold apparatus of the aforedescribed nature provided with novel means simplifying installation of the steam-fitting blocks onto the mold.

Other important objects and advantages of the tire mold apparatus of the present invention will become apparent from the following detailed description.

BRIEF DESCRIPTION OF THE DRAWINGS

FIG. 1 is a perspective view showing a tire mold apparatus embodying the present invention;

FIG. 2 is a fragmentary vertical sectional view of the lower matrix of said mold;

FIGS. 3 and 4 are front elevational views in enlarged scale of a steam-fitting block assembly forming part of the present invention;

FIG. 5 is a broken vertical sectional view taken on line 5—5 of FIG. 3; and

FIG. 6 is an exploded perspective view of the steam-fitting block assembly of FIGS. 3, 4 and 5.

DESCRIPTION OF THE PREFERRED EMBODIMENT

Referring to the drawings, and particularly FIG. 1 thereof, there is shown a tire mold apparatus A utilizing a steam tube construction embodying the present invention. The tire mold apparatus A is of the same general type disclosed in Louis T. Fike U.S. Pat. No. 3,154,814, issued Nov. 3, 1964. Tire mold apparatus A is of massive and heavy construction, particularly adapted for retreading relatively large off-the-road tires, such as used on heavy trucks and earth moving equipment. The tire mold apparatus A includes a stand 14 whereon is positioned a molding section 16. Molding section 16 comprises a pair of similarly constructed upper and lower platens 20 and 22 which are annular in shape in that each is provided with a central opening. The lower platen 22 rests on the upper edge of stand 14. The upper and lower platens 20 and 22 support an upper matrix 26 and a lower matrix 28, both shown in FIG. 2. The tire mold apparatus described thus far is of conventional construction.

The steam tube arrangement embodying the present invention is utilized both with upper matrix 26 and lower matrix 28. Such arrangement will be described hereinafter, however, only in conjunction with the lower matrix 28.

Lower matrix 28 is preferably formed of aluminum and its outer periphery is provided with a continuous convoluted groove 40 wherein a length of copper steam tubing 42 is positioned. The copper tubing is deformed by a special tool so that no tubing extends beyond the periphery of the matrix 28. After such copper tubing has been positioned within groove 40, a steel band or shell 44 is tightened radially inwardly so as to maintain this deformed shape of the tubing 42 that initially projected beyond the outer periphery of matrix 28 in the manner described in the aforesaid Louis T. Fike U.S. Pat. Nos. 2,932,853 and 3,154,814. Preferably, a layer of asbestos 46 is interposed between the outer periphery of matrix 28 and the inner periphery of band 44. The deformation of the copper tubing 42 will maintain the tubing 42 in firm heat transfer relationship with the matrix 28 when steam is passed through such tubing during a curing operation. The advantages of this feature are fully described in the aforementioned Fike U.S. Pat. Nos. 2,932,853 and 3,154,814.

With continued reference to FIG. 2 and referring additionally to FIGS. 3-6, the upper and lower portions of matrix 28 are provided with upper and lower recesses 48 and 50, respectively, for receiving like brass steam-fitting blocks, generally designated 52 and 53. Suitable conventional fittings 54 and 55 releasably connect blocks 52 and 53 with steam conduits 56 and 57. As indicated particularly in FIGS. 3 and 4, the recesses 48 and 50 are elongated horizontally and the dimensions of the steam-fitting blocks and such recesses are so selected that such blocks can readily move horizontally within their respective recesses. Each steam-fitting block is provided with a radially outwardly extending neck 64 having upper and lower horizontal flats 66 which complimentally interfit with upper and lower horizontal flats 68 of an aperture 69 formed in a connector plate, generally designated 70, which is welded to the outer periphery of band 44 in alignment with an opening 72 formed in band 44 to accommodate the steam-fitting block 52. The sides of connector plate aperture 69 are provided with a curvature similar to that of the sides of steam-fitting block 52.

The intermediate portion of steam-fitting block 52 is provided with a radially extending bore 80 that snugly receives the upper end of the tubing 42. Such tubing end is secured within bore 80 as by silver soldering. Steam-fitting block 52 is also provided with a central passage 90 which merges into the radially inner end of bore 80. The front end of passage 90 is threaded to receive the threaded inner end 91 of fitting 52. It will be understood that the lower steam fitting block 53 and its associated parts are identical to those described hereinbefore with respect to upper steam-fitting block 52.

In the operation of the aforedescribed tire mold apparatus, steam flows into and out of the tube 42 through fittings 56 and 57 in order to effect curing of a tire tread onto a tire casing (not shown). Inasmuch as the copper tubing 42 will expand slower than the aluminum matrix 28, the tubing will contract linearly relative to the matrix. In a conventional tire mold apparatus having a fixed steam-fitting block, such differential in movement would cause the tubing to undergo movement away from the steam-fitting block 52 thereby placing considerable stress on the joint between the end of the tube and the steam-fitting block 52. With the aforedescribed arrangement, however, the steam-fitting block 52 merely floats within recess 48 in matrix 28 and aperture 69 in connector plate 70, from its position in FIG. 3 to its position in FIG. 4. It will be apparent that when the flow of steam through tube 42 stops and matrix 28 cools, steam-fitting block 52 will be free to return to its original position of FIG. 3. Accordingly, the imposition of stress upon the joint between the end of the tubing 42 and the steam-fitting block 52 is substantially eliminated. It will be apparent that the lower steam-fitting block assembly will function in the same manner as the upper steam fitting block assembly.

Another advantage of the present invention is provided by the complimentally slidable interfitting of the flats 66 on steam-fitting block 52 and flats 68 on connector plate 70. This interfitting relationship permits the steam-fitting block to undergo lineal movement relative to the matrix and connector plate without permitting relative rotation therebetween. Accordingly, the steam-fitting end 91 can be readily threaded into the steam-fitting block without requiring special tooling and/or manufacturing techniques.

Various modifications and changes may be made with respect to the foregoing detailed description without departing from the spirit of the present invention.

We claim:

1. In tire mold apparatus having a matrix formed with a groove wherein is positioned a steam tube having a different rate of thermal expansion than the material of said matrix, and with each end of said steam tube being rigidly affixed to a steam-fitting block, the improvement comprising:

a recess formed in said matrix for each of said steam-fitting blocks, each said recess being larger than its respective steam-fitting block whereby said steam fitting blocks float relative to their respective recess as said steam tube undergoes thermal expansion and contraction relative to said groove.

2. Tire mold apparatus as set forth in claim 1, wherein:

means are interposed between said block and said matrix to prevent relative rotation therebetween.

3. In tire mold apparatus having a matrix formed with a groove wherein is positioned a steam tube having a different rate of thermal expansion than the material of said matrix, and with each end of said steam tube being rigidly affixed to a steam-fitting block, the improvement comprising:

a radially outwardly extending neck on said block, said neck being formed with a flat; and a connector plate rigidly secured to said mold outwardly of said recess, said plate being formed with an aperture having a flat complemental to the flat of said neck, with said flats slidably interfitting to prevent relative rotation between said block and said plate.

* * * * *